Jan. 3, 1961  C. H. CARLISLE ET AL  2,967,291
AUTOMATIC PLOTTER

Filed June 7, 1955  7 Sheets-Sheet 1

INVENTORS.
Charles H. Carlisle,
Frank L. Chalmers,
BY  James A. Smith.

ATTORNEY

Jan. 3, 1961   C. H. CARLISLE ET AL   2,967,291
AUTOMATIC PLOTTER

Filed June 7, 1955   7 Sheets-Sheet 3

INVENTORS.
Charles H. Carlisle,
Frank L. Chalmers,
James A. Smith,
BY Frank S. Tridl
ATTORNEY.

FIG. 11.

Jan. 3, 1961  C. H. CARLISLE ET AL  2,967,291
AUTOMATIC PLOTTER

Filed June 7, 1955                                    7 Sheets-Sheet 7

INVENTORS.
Charles H. Carlisle,
BY Frank L. Chalmers,
James A. Smith.
Frank S. Troidl
ATTORNEY.

United States Patent Office 2,967,291
Patented Jan. 3, 1961

2,967,291
AUTOMATIC PLOTTER

Charles H. Carlisle, Houston, and Frank L. Chalmers, Bellaire, Tex., and James A. Smith, Los Angeles, Calif., assignors, by mesne assignments, to Jersey Production Research Company, Tulsa, Okla., a corporation of Delaware Filed June 7, 1955, Ser. No. 513,854

2 Claims. (Cl. 340—15)

This invention relates to the art of determining the location of subsurface structures. More particularly, this invention relates to a new and useful apparatus for automatically plotting a subsurface cross-section.

In the art of geophysical prospecting, it is common practice for human computers to take seismograms, which have been obtained from the field, and correlate the seismograms to obtain a cross-section of various subsurface formations, the purpose being to identify subsurface formations which might be conductive to the production of valuable minerals such as oil and gas.

Each individual seismogram is obtained by shooting off an explosion, or by other well known means, setting up elastic waves within the subsurface of the earth and detecting the elastic waves reflected from reflecting surfaces by means of seismometers. The seismometers translate the elastic vibrations into electrical signals. When a seismogram has been obtained at one location in a particular area, a second seismogram is then obtained at an adjacent location in the same area by shooting off a second explosion and obtaining a seismogram therefrom. The same procedure is followed until the entire area is surveyed. The seismograms thus obtained are arranged adjacent to one another, but shifted with respect to each other along the time axis if necessary to correct for differences in elevation and low velocity layer at the different points. This arrangement provides the computer with a continuous profile of the reflecting surfaces and the depth (appearing as time on the seismograms) of the reflecting surfaces. An example of such a procedure is that shown in the patent to L. F. Athy et al., 2,539,220, issued January 23, 1951.

The foregoing procedure, however, is very time consuming and necessitates the photographic reproduction of the seismograms obtained in the field and a second photographic reproduction to obtain the continuous profile after the seismograms have been correlated. Furthermore, elevational and low velocity corrections cannot be applied individually to each trace of a record, as it is often desirable to do. Also, the step out or spread correction cannot be applied in the aforesaid procedure. Therefore, an apparatus which could automatically produce a continuous profile of subsurface formations, without necessitating any photographic processing of records, would be highly desirable. Such an apparatus would require that the corrections such as elevational corrections, low velocity layer corrections, and step out or spread corrections be applied to the records and also require that a permanent record be obtained. Previous apparatus have been designed in an attempt to devise an automatic cross-section plotter. However, these previous apparatus either plot only one individual trace of a record at a time or do not have any means for producing a permanent and complete cross-section.

We have devised and invented an automatic cross section plotter which performs each of the functions formerly performed by human computers but performs these same functions quickly and accurately and without photographic processing, thereby saving great time and effort. Our new automatic seismic cross-section plotter applies all of the necessary corrections to the seismograms and quickly and automatically translates a plurality of records, each record having a plurality of traces thereon, as a profile record showing a continuous profile obtained from said plurality of records. The profile record obtained from each seismogram is reduced in width without necessitating a photographic reduction in width. Hence, the profile record obtained from the plurality of seismograms is easily handled and the promising reflecting surfaces easily ascertained.

We have also devised a new apparatus for obtaining seismic records in the field, which records are of a different form than the form of seismogram ordinarily obtained in the field utilizing the customary geophones, amplifiers and galvanometers. Our new type of record requires no photographic processing. Furthermore, it is smaller thus more easily handled than conventional seismograms and reflections can more easily be obtained and observed on our new type records than could be obtained and observed on conventional seismograms. Also we have devised new apparatus for making seismic cross-sections directly and automatically in the field, which are of great benefit in the conduct of field operations. This is a procedure completely new in the art of oil exploration.

Briefly described, our new automatic cross-section plotter consists of a first drum and a second drum. Both of the drums are rotated by a driving means such as a motor. A record obtained in the field is placed upon the first drum. Means are positioned about the first drum for translating the record into electrical signals, which electrical signals are conducted to a means for imparting a profile record upon electrosensitive means located about the periphery of the second drum. Means are also provided for automatically applying the necessary corrections to the records. Means are further provided for putting a second profile recvord on the electrosensitive means adjacent the first profile record on the same paper after the original record obtained from the field is removed from the first drum and replaced by another field record.

The second rotatable drum upon which the electrosensitive means is placed can be used directly as a field instrument. However, the necessary corrections are not automatically applied to the records when so used. When used as a field instrument the usual geophones and amplifiers are utilized. However, the drum and associated equipment is put into the electrical system in place of the customery recording equipment. Microswitches are disposed on the drum to correlate the firing of the explosion and the initiation of the operation of the drum. The record is obtained directly on the electrosensitive means in its final form and no photographic development of the records is necessary.

Other objects and a fuller understanding of the invention may be had by referring to the following description and claims, taken in conjunction with the accompanying drawings in which:

Figures 1, 2:
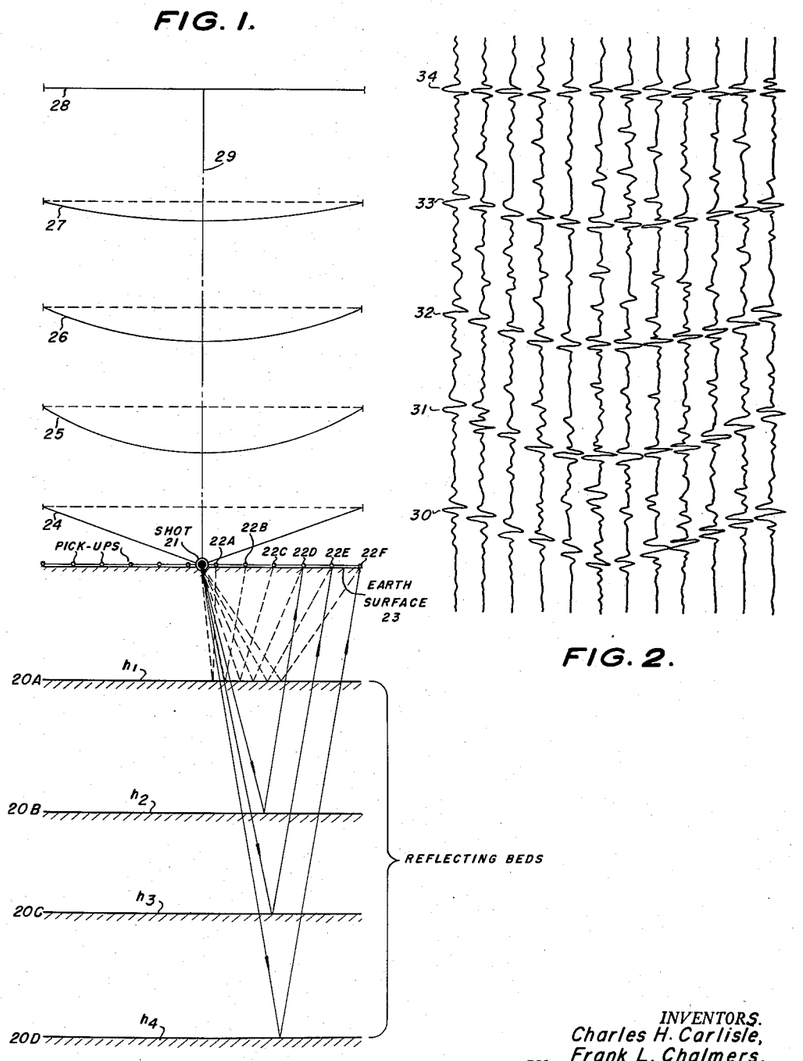
Fig. 1 is a showing, in graphical form, of a plurality of reflecting subsurfaces and also showing the time distance curves of the reflected waves from each successive subsurface.
Fig. 2 is a representation of a seismogram such as obtained by the reflecting surfaces of Fig. 1.

Referring more particularly to the drawing, Fig. 1 shows a plurality of reflecting subsurfaces 20A, 20B, 20C, and 20D. Arranged on the surface is a shot point 21 and a plurality of pickups 22A through 22F. At the shot point, an explosive charge is usually exploded and this sets up elastic waves which travel to the subsurfaces 20A through 20D. Some of these waves are reflected from each subsurface reflecting surface and detected by the pickups 22A through 22F.

Though the surface of the earth 23 is shown as a flat surface, in actual practice the surface is not perfectly flat and might have a different elevational value from one pickup to the next pickup. Corrections must be made to the record obtained by the geophones to compensate for the differences in elevation between each respective pickup. Also, there is a so-called "low-velocity" layer of the earth which is the upper portion of the earth extending to about 50 feet or 100 feet below the surface. The low-velocity layer consists of relatively unconsolidated material through which seismic velocity is low and highly inconsistent and variable. Hence a "low-velocity" time correction (as determined from the direct up-hole time of the seismic waves) is applied to the record, and this reduces the time on the record to correspond to some arbitrary datum plane below the low-velocity layer. The corrections applied for elevational differences and the corrections applied for the low-velocity layer are both constant corrections, that is, they do not vary along the record.

The waves which travel downwardly and impinge upon each subsurface reflecting surface and reflected are first detected by the geophones nearest the shot point. As the distance from the shot point along the surface to each geophone is increased the time it takes a reflected wave to reach each successive geophone is increased. Hence waves reflected from the subsurface 20A, for example, are first detected by geophones 22A then an interval of time later by geophones 22B then by geophones 22C, 22D, 22E, and 22F. Waves are also transmitted directly along the surface to be detected successively by the geophones 22A, 22B, 22C, 22D, 22E, and 22F. The straight line 24 and the curved lines 25, 26, 27, and 28 are used to denote the time, measured along the ordinate 29, it takes for a particular seismic reflection wave to impinge the geophones. The straight line 24 is the time curve of the direct surface waves, the time being represented by the formula $$T = \frac{X}{V}$$

where X represents the distance from the shot point 21 of each geophone and V is the velocity of the seismic wave along the surface. Curve 25 represents the time curve of waves reflected from reflecting subsurface 20A, curve 26 represents waves reflected from reflecting subsurface 20B, curve 27 represents the time distance curve of seismic waves reflected from 20C and curve 28 the curve of waves reflected from 20D. These curves have the formula $$T = \frac{1}{V}\sqrt{X^2 + 4H^2}$$

where V is the velocity of the seismic wave down to the reflecting subsurface, X is the distance of the geophone from the shot point, and H represents the depth of the particular reflecting subsurface. As can be seen from Fig. 1, the time distance curve of the reflecting subsurfaces approaches a straight line as the depth of the reflecting subsurface increases. Since it is desired that the time-distance curves depend only on the depth of the reflecting surface below the shot point 21, corrections must be applied to the reflection times at the various pickups, this correction being for each pickup the additional travel time of the seismic wave to this pickup over the time for the seismic wave to travel directly downward to the reflecting bed and back to shot point 21. The correction so applied is usually termed as a "step-out" or "spread" correction. The step-out correction is not a constant correction but rather a correction which continually decreases as the travel time of the waves increases. Practically no correction is needed for the very deep reflections whereas a fairly large correction is required for the near surface reflections.

Fig. 2 shows the type of traces which might be obtained from the subsurface formations 20A, 20B, 20C, and 20D shown in Fig. 1 using conventional recording methods with 6 geophones being arranged in spaced apart relation on each side of the shot point 21. As can be clearly seen, the waves 30, 31, 32, 33, and 34, which indicate the presence of a subsurface reflecting surface, have the same lineal form as the time distance curves 24, 25, 26, 27 and 28, respectively, of Fig. 1. The human computer, in obtaining a continuous subsurface profile of reflecting surfaces, takes a plurality of records, such as that shown in Fig. 2 taken adjacent one another in the same vicinity, aligns the records adjacent to one another, applies the elevational and low-velocity layer corrections by shifting records with respect to each other, and then photographically makes a single record showing the subsurface profile.

Figure 3:
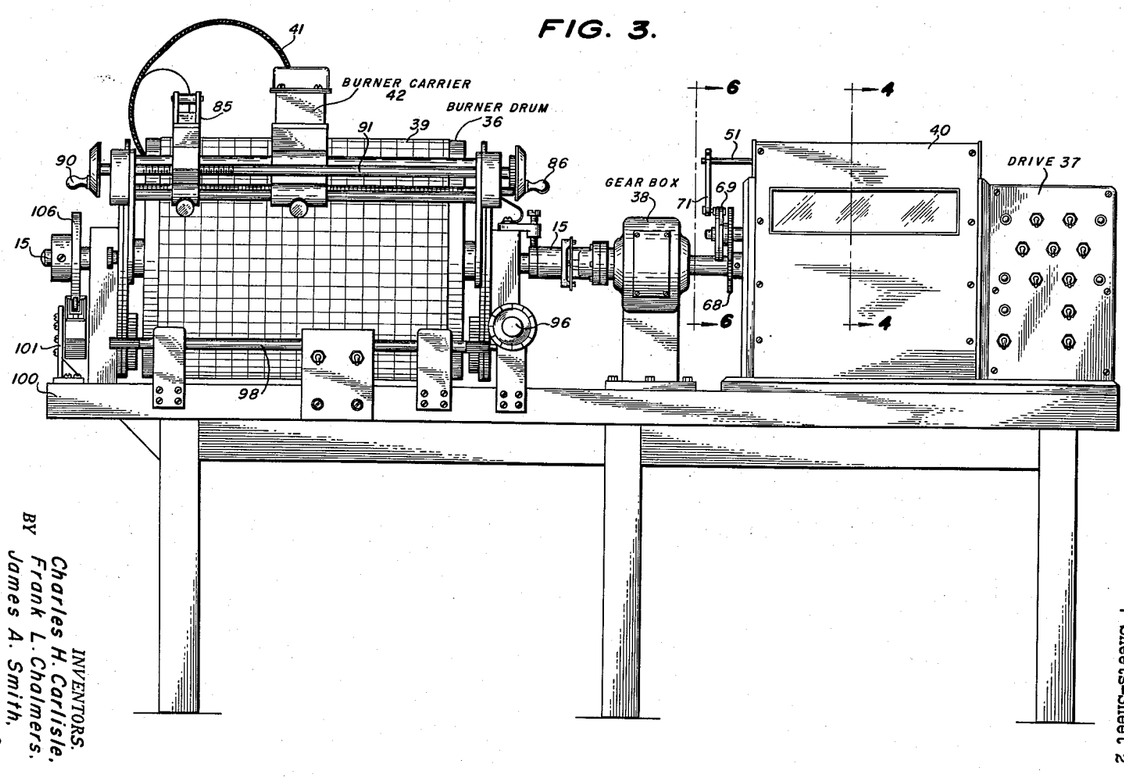
Fig. 3 is a front elevational view of our new automatic seismic plotter.

Our new apparatus automatically performs all of these corrections to each individual record, and produces a subsurface profile which is very compact. After the first record has been recorded in its more compact form, our new apparatus provides means for recording the next record immediately adjacent the more compact record obtained from the first record. An overall view of our new apparatus is shown in Fig. 3. As shown in Fig. 3, our new seismic plotting apparatus includes a first rotatable drum which is enclosed in a housing 40 and more clearly shown in Figs. 4, 5 and 6 and a second rotatable drum 36. A record obtained in the field is mounted upon the first rotatable drum. The record may take the form of a magnetic record obtained directly in the field. When recorded on a magnetic medium there are no visible signals on the seismogram such as those shown in Fig. 2. However, the magnetic medium is magnetized proportionately to the amplitude of the seismic waves. Hence, when the seismic waves are recorded on a magnetic medium there will be a greater amount of magnetization at those points on the magnetic medium representing subsurface reflecting surfaces at the same time along the magnetic medium as the time occurrence of the higher amplitude signals shown at 30 through 34 of Fig. 2. A motor 37, or other suitable driving means, is utilized for rotating the first rotatable drum 35. Interconnecting the drums 35 and 36 is a shaft 15. A gear box 38 containing a differential gear mechanism is utilized to apply any desired ratio between the rates of revolution of drums 35 and 36. Mounted upon drum 36, which we shall call the burner drum, is electrosensitive means such as electrosensitive paper 39. The electrosensitive paper consists of a base sheet of higher calender paper made conductive by carbon black uniformly distributed throughout its fibers, coated with a thin adhesive film which comprises an electrosensitive marking system. This coating material is primarily a lacquer containing a light-colored inorganic chemical compound capable of being converted, by a moderate amount of electrical energy, into a dark-colored compound. The first drum is mounted within the housing 40. Also mounted within the housing 40 are a plurality of magnetic heads. These magnetic heads will be shown in more detail in connection with Fig. 4. The magnetic heads convert the varying magnetic field of the seismic record into electric signals, which electric signals are conducted through conductor 41 to the burner carrier 42, which burner carrier carries a plurality of styli, which styli are electrically conductive so that electrical energy passing through the styli will cause markings to appear on the electrosensitive paper 39. These markings will be proportional in width and darkness to the amplitude of the current passing through the styli.

Figures 4, 5, 6:
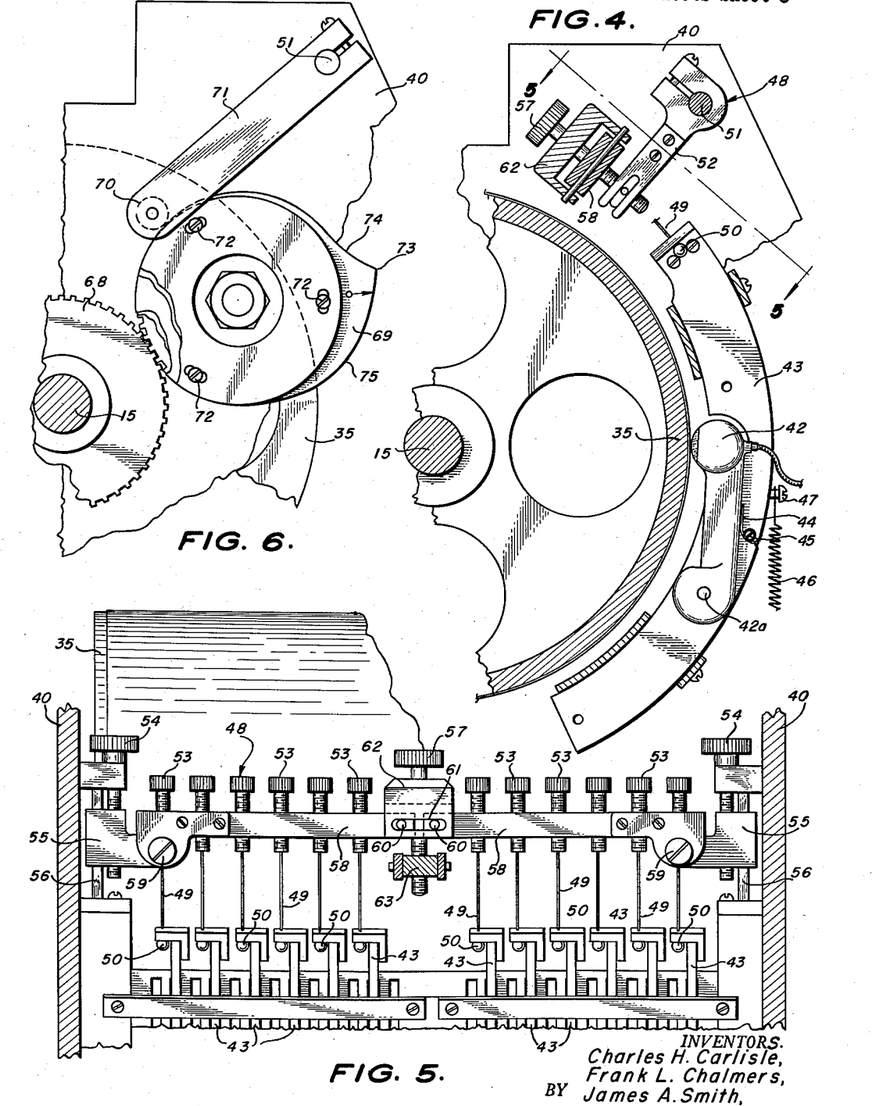
Fig. 4 is a section taken along lines 4—4 of Fig. 3.
Fig. 5 is a front view of part of the step-out correction mechanism taken along lines 5—5 of Fig. 4.
Fig. 6 shows the cam mechanism utilized to apply the proper step-out correction.

Fig. 4 shows, in detail, one of the magnetic heads utilized in my new apparatus. The magnetic head 42 is mounted close enough to the rotatable drum 35 to detect the variations in magnetic intensity on the record and generate an electric current, which varies in accordance with the variation in magnetic intensity. The magnetic head is pivotally mounted upon a slide bar 43 by means of pivot 42a and is biased toward drum 35 by a spring 44 which is held by screw 45. A slide bar return spring 46 is mounted to the slide bar 43 by means of a screw 47. Spring 46, which is attached to the housing 40, applies a bias downwardly. The slide bar 43 is connected to a correcting mechanism 48 by means of a wire and ball connection 49 and 50, respectively. The correcting mechanism 48 includes an actuator arm 51, which is caused to rotate by a cam mechanism, which cam mechanism will be subsequently described in connection with Fig. 6. An actuating bar 52 is connected to actuating arm 51 so that the actuating bar 52 pivots about actuating arm 51. When actuating arm 51 is rotated in the clockwise direction (looking at Fig. 4) the slide bar 43 and magnetic head 42, which is connected to the slide bar by means of pivot 42a, is moved about the periphery of the drum 35 against the force of slide bar return spring 46.

Fig. 5 shows another view of the means for applying the necessary corrections to the magnetic record. The elevational and low-velocity layer corrections are constant corrections which are applied to the record. Hence, these corrections need only be applied once before the magnetic record is translated into a "burner" record. Individual adjustment screws 53 are utilized to apply the elevational and low-velocity layer corrections. As can be seen from an examination of Fig. 5, the adjustment screws 53, when rotated in either direction, will, because of the spring and ball connection to slide bars 43, move slide bars 43 about the periphery of the drum 35. Hence, each slide bar 43, to which is attached a magnetic head with one magnetic head being attached to each slide bar, can be individually adjusted to correct for variations in elevation between each pickup and also correct for the low-velocity layer. Also provided are end adjusting screws 54 for adjusting, if desirable, slide brackets 55 along slide tracks 56. A center adjusting screw 57 is also provided.

Though the elevational and low-velocity layer corrections are constant, as previously explained, the corrections which must be applied for the step-out or spread are not constant. Hence, a continuously varying correction must be applied to the magnetic record. This correction continually decreases and approaches no correction as the time (and hence depth of the subsurface reflecting layers) increases. To apply the step out correction, our new apparatus includes two ratio bars 58, which are pivotally connected to slide brackets 55 by means of pivots 59. Ratio bars 58 each has at its ends a pin 60. These pins 60 slide within a slot 61 formed in yoke 62 as the ratio bars 58 are pivoted about pivot 59. The pivotal movement of ratio bars 58 is effected by rotation of actuating arm 51 which pivots actuating bar 52. The force exerted by actuating bar 52 is transmitted to actuating pin 63 and yoke 62 to thereby move ratio bars 58.

The means for applying the proper step out correction to actuating arm 51 is shown in Fig. 6. A cam drive gear 68 is connected to drum shaft 15. Hence, as the drum shaft 15 is rotated by motor 37 along with the rotating drums 35 and 36, the cam drive gear 68 rotates a step-out cam 69. Step-out cam 69 serves as a guide for cam follower 70. Cam follower 70 is connected to a cam arm 71 with the cam arm 71 being connected to actuator arm 51. Adjusting screws 72 are provided to adjust the "zero" time to its proper position. The zero time index shown on the step-out cam 69 is positioned to give a slight time delay between the zero time on the record and the time of the application of the step-out correction. The step-out correction is actually applied when the cam follower 70 is at point 73 on cam 69. The curved portion 74 of the step-out cam 69 is designed to apply the proper step-out correction to the record, which varies with time. The portion 75 of step-out cam 69 is utilized to move the ratio bars 58 (shown in Fig. 5) to the proper position to begin the step-out correcting operation. As the cam 69 is rotated in a clockwise direction, as shown in Fig. 6, the cam follower 70 first rides along portion 75 of cam 69. The movement of cam follower 70 causes actuator rod 51 to also move in a clockwise direction. The clockwise movement of actuator rod 51 results in actuator bar 52 pivoting about actuator rod 51 thereby moving ratio bars 58 upwardly about pivots 59 (see Fig. 5). The upward movement of ratio bars 58 will cause movement about the periphery of drum 35 of magnetic heads 42. When cam follower 70 reaches point 73 on step-out cam 69, the ratio bars 58 are ready to apply the proper step-out correction. As cam follower 70 rides along portion 74 of step-out cam 69, the movement of actuator rod 51, in a counter clockwise direction, results through the means interconnecting actuator rod 51 and magnetic heads 42 in the movement of magnetic heads 42 as a result of the downward motion of ratio bars 58. From the configuration of portion 74 of step-out cam 69, it can be seen that the amount of correction applied will be greatest immediately following point 73 which corresponds to the earliest time on the record at which the corrections are applied. The step-out correction then continually decreases as cam follower 70 moves along portion 74. When comparing the movement of ratio bars 58 with the lineal configuration of lines 30, 31, 32, 33, and 34 of the seismogram of Fig. 2 it can be seen that as the seismogram is rotated past magnetic head 42 the position of the ratio bars 58 is such as to apply a correction to each of the traces which will approximately line up the reflections.

Figure 7:
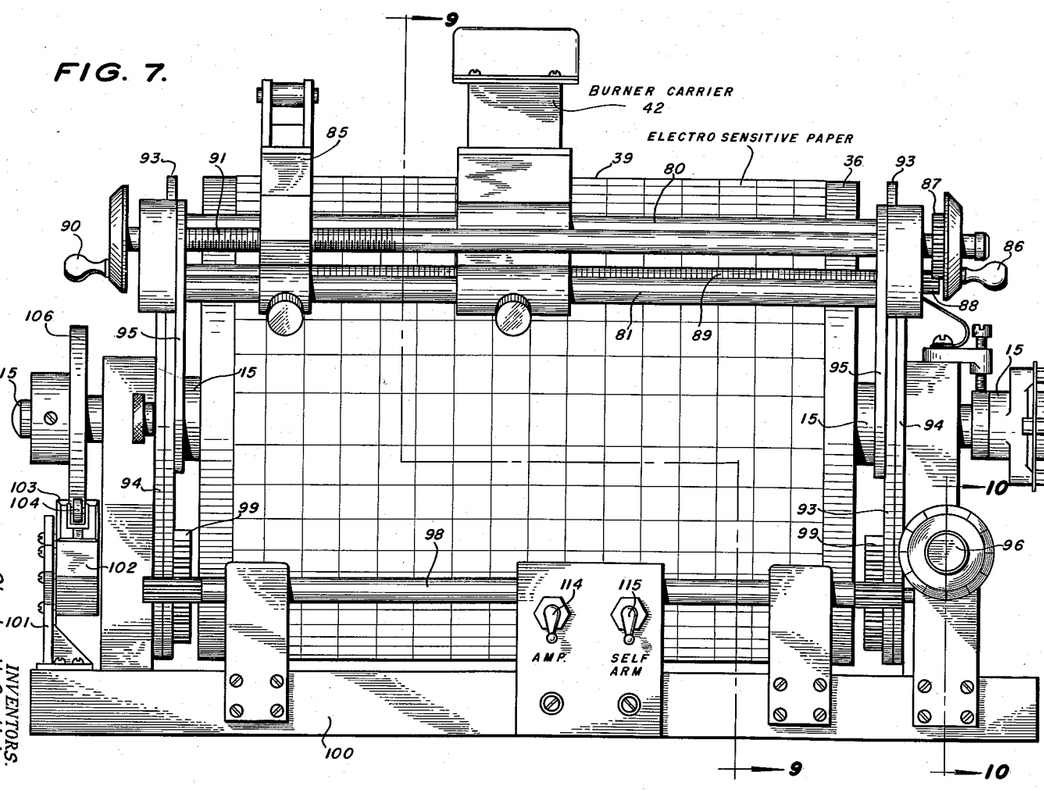
Fig. 7 is an enlarged front elevational view showing the drum upon which the continuous subsurface profile is to be recorded.
Figure 9:
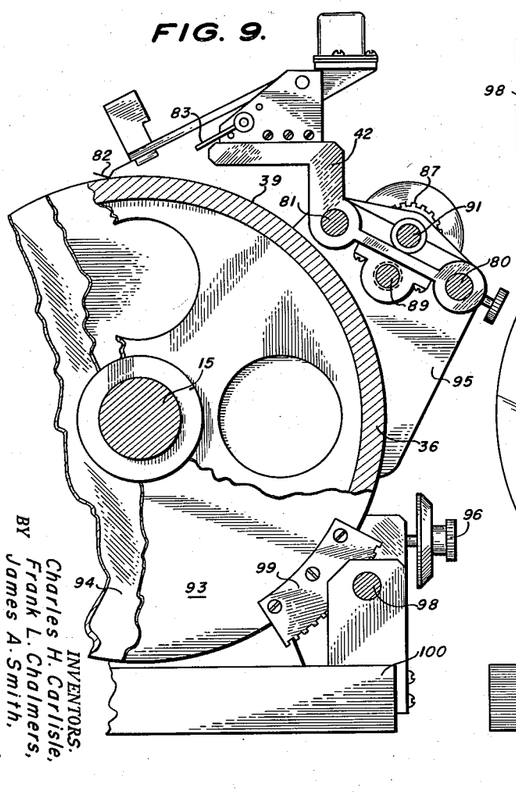
Fig. 9 is a sectional view taken through lines 9—9 of Fig. 7.

Fig. 7 is a view of the burner drum 36 upon which the electrosensitive paper 39 is positioned. Mounted upon guides 80 and 81 is the burner carrier 42. The burner carrier 42 has positioned thereon a plurality of styli 82, Fig. 9. At least one stylus 82 is provided for each of the magnetic heads 42. When the styli 82 are in contact with the electrosensitive paper 39 and a current is flowing through the styli 82, a plurality of marks are recorded on the electrosensitive paper 39. The marks vary in width and darkness in accordance with the amount of magnetization on the record from which the marks are being made. The greater the magnetization, which corresponds with greater seismic wave amplitude, the thicker and darker the marks will be. Styli 82 can be lifted off electrosensitive paper 39 by movement of a cam operating pin 83. Also included is a time break stylus carrier 85. The time break stylus is utilized to coincide with the time at which the shot 21 (see Fig. 1) is exploded. In preparing a cross-section, the time breaks of the plurality of records should all occur at the same time and hence be aligned on the cross-section. This alignment is accomplished by means of a burner carrier angular adjustment mechanism, as will be explained.

Horizontal adjustment of burner carrier 42 is accomplished by the rotation of horizontal adjuster 86. The rotation of horizontal adjuster 86 causes rotation of gears 87 and 88 and drive screw 89 effecting the horizontal movement of burner carrier 42 along guides 80 and 81. Carrier 85 may be further adjusted relative to burner carrier 42 by utilizing horizontal adjuster 90 to move carrier 85 horizontally along screw 91.

Figures 8, 10:
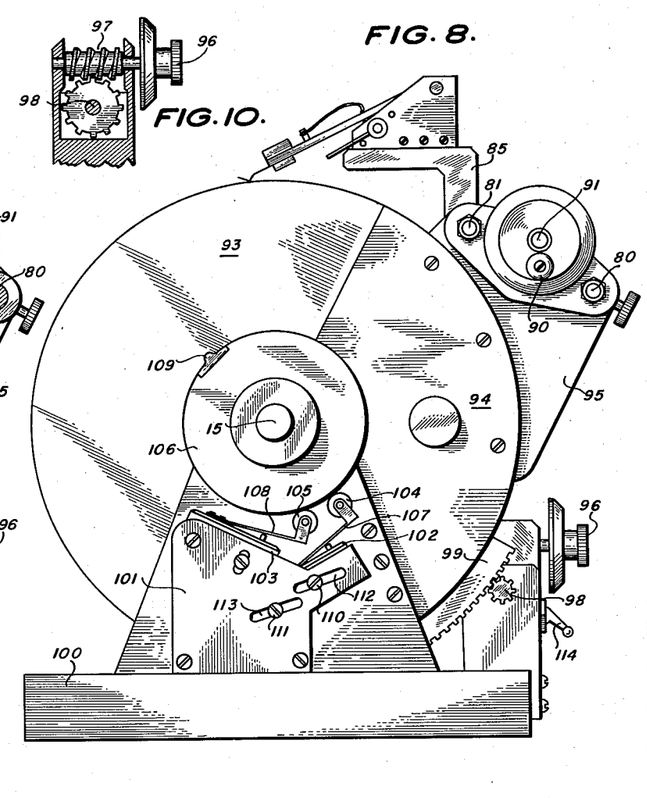
Fig. 8 is an end view of Fig. 7.
Fig. 10 shows the worm and gear arrangement utilized in adjusting the burner carriers.

Provided in our new apparatus is a movable disk 93 and a stationary disk 94. The movable disk 93 is interconnected with the means for horizontally adjusting burner carrier 42 and carrier 85 by means of a bracket 95, as shown in Fig. 8. Hence, any movement of movable disk 93 results in a movement of the horizontal adjustment members and hence the styli 82 about the periphery of the drum 36. This movement is accomplished by means of a burner carrier angular adjustment knob 96 which operates through a worm and gear mechanism 97 to rotate member 98, which member 98 rotates a gear sector 99 connected to movable disk 93.

As shown in Fig. 8 the support 100 has mounted thereon a microswitch mount 101. Mounted within the mount 101 are two microswitches 102 and 103. Connected to microswitches 102 and 103 are rollers 104 and 105, respectively. These rollers are biased against a disk 106, which rotates when the shaft 15 is rotated by driving means 37. Rollers 104 and 105 are biased against the disk 106 by means of springs 107 and 108. Microswitches 102 and 103 are actuated by a protruding portion 109 located on the disk 106. The microswitches and electrical circuit connected therewith are such that when protruding portion 109 moves spring 107 to actuate microswitch 102, the electrical circuit will operate until the burner drum 36 has made one complete revolution. Upon one revolution, protruding portion 109 will actuate microswitch 103 and the recording operation will terminate and will not recommence even if microswitch 102 is again actuated. Hence a means is provided for preventing the rerecording of the same information on the electrosensitive paper 39. The position of microswitches 102 and 103 may be adjusted by means of screws 110 and 111 and slots 112 and 113.

Figure 11:
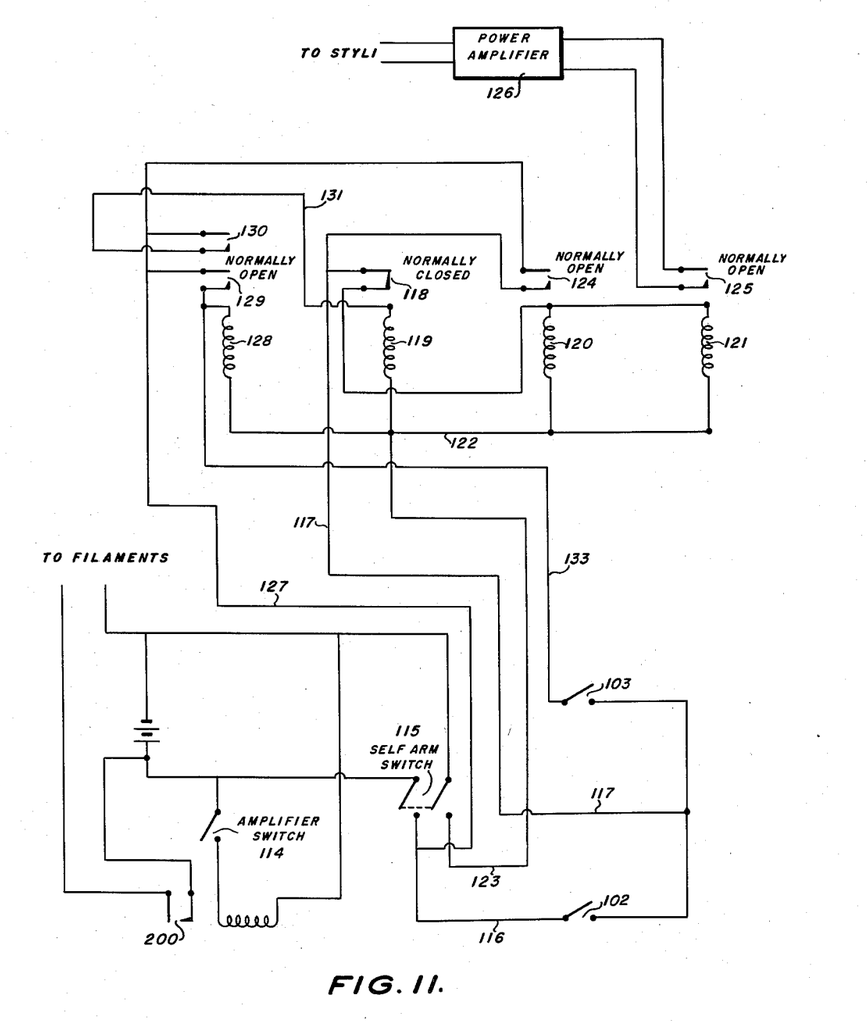
Fig. 11 is an electrical circuit utilized for controlling the supply of power to the styli of the plotter drum.

The electrical circuit for preventing rerecording is shown in Fig. 11. The electrical circuit will not operate unless the amplifier toggle switch 114 is closed. However, when amplifier toggle switch 114 is manually closed, causing the actuation of switch 200, voltage from the battery is supplied and maintained on the filaments of the tubes in the amplifiers (not shown). When it is desired to record a profile on the electrosensitive paper, switch 114 is closed; and after the filaments are heated, the two interconnected drums of our apparatus are rotated by means of the driving means. Self arm switch 115 is then manually operated preparatory to recording. Then when microswitch 102 is actuated by protruding means 109 (Fig. 9) voltage is supplied from the battery through conductors 116 and 117 and through the normally closed contact 118 of relays 120 and 121 and conductors 122 and 123. The energization of relays 120 and 121 effect the closing of contacts 124 and 125, these contacts being normally open. Voltage is then supplied to the power amplifier 126 and from there voltage is supplied to the styli which will record any signal fed to them. The closing of contact 124 locks in the voltage across relays 120 and 121 so that even if microswitch 102 is again opened relays 120 and 121 will stay energized, until microswitch 103 is momentarily closed. After one revolution of the drum 36 microswitch 103 is actuated momentarily by member 109. When microswitch 103 is closed, current is conducted through conductors 127 through contact 124, conductor 117, microswitch 103 and conductor 133 to relay 128 which closes and locks normally open contacts 129 and 130. Current is then fed through relay 119 through conductor 131 and contact 130 to thereby open normally closed contact 118. When contact 118 is open, the path of electricity to relays 120 and 121 is broken so that contact 125 is opened and the styli, therefore, no longer record. Because of the locking action of relays 120 and 128, relays 128 and 119 will remain energized so that any subsequent activation of microswitch 102 will not initiate the sequence of events again. Only after self arm switch 115 is manually broken do relays 128 and 119 become de-energized and then the sequence can be repeated for the recording of the next record.

Figure 12:
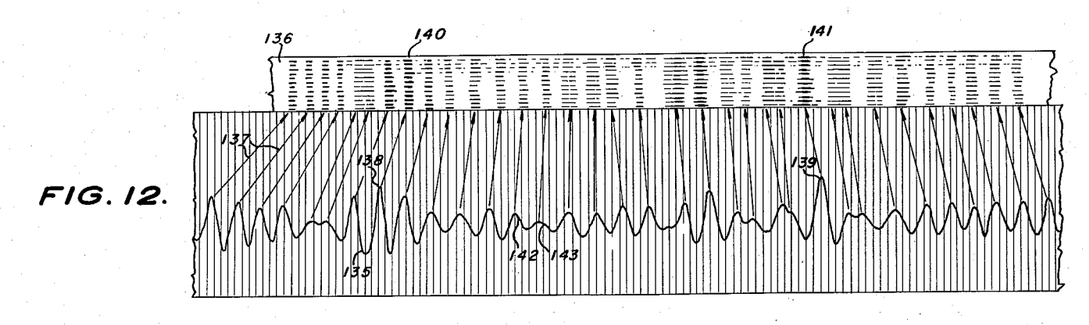
Fig. 12 shows one trace of a seismogram and also shows the type of record which might be obtained from said trace utilizing our new apparatus.

Fig. 12 shows an example of a seismogram trace 135 and the type of record 136 which is obtained by our new apparatus. There were 12 styli used for the one seismogram 135. Lines 137 of Fig. 12 are used to join certain events on trace 135 which the records on record 136 obtained from these events. Throughout the time that a wave on trace 135 is above the zero level, a short line segment is burned on the electrosensitive paper, whereas no line segment is made when the wave is below the zero level. Further, the width and darkness of the line segment is proportional to the amplitude of the positive wave which caused it. For example, the amplitudes at points 138 and 139 are larger than the average amplitude of trace 135. Points 138 and 139 appear at 140 and 141 as relatively wide and dark marks. On the other hand, points on trace 135 of relatively low amplitude, such as 142 and 143, appear as relatively narrow and light marks. The large wiggles 138 and 139 probably represent reflected energy from some subsurface formation. When a plurality of records 136 are recorded on the burner drum 36 they are lined adjacent one another and when so lined the darker marks clearly present themselves showing the general structure of subsurface reflecting formations and the depth at which these structures occur.

In operation, when our new apparatus is used as an automatic seismic plotter the magnetic records which are taken in the field are consecutively mounted upon the drum 35. The drum is rotated by motor 37 along with drum 36. As the drum is rotated step-out cam 69 is also rotated applying the proper step-out correction, the corrections for elevation and the low-velocity layer correction having been previously applied by the individual adjustment of adjusting screws 53. As the two drums rotate the varying magnetic intensity on the record is registered on the electrosensitive paper as marks varying in area and darkness. When one complete revolution of the burner drum 36 is complete microswitch 103 will be actuated to discontinue recording and even if the drums continue to rotate the styli will no longer record after one revolution has been completed. The two drums are then stopped and the first magnetic record removed and replaced by a second record taken in the field adjacent the area where the first record was taken. Horizontal adjustment knob 86 is then rotated to thereby move burner carrier 42 and carried 85 horizontally preparatory to the recording of the next record. The cycle is then repeated until a complete cross-section has been obtained.

Figure 13:
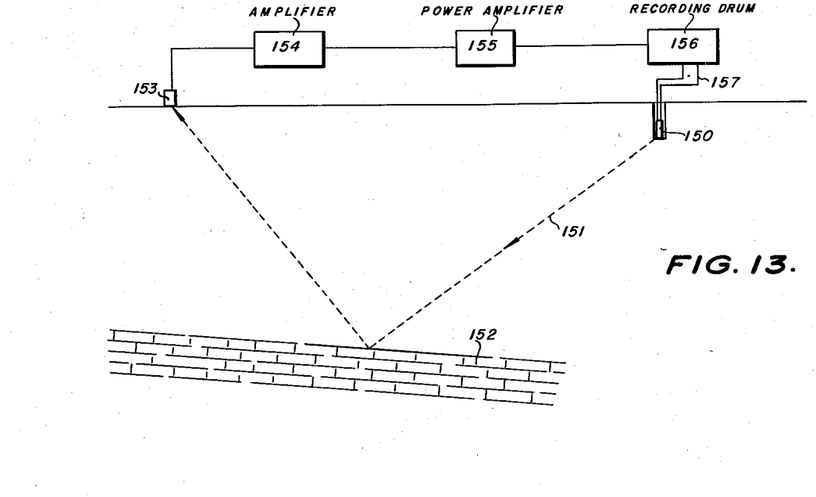
Fig. 13 is a view, partially in block diagram, showing a system which can be utilized for taking records directly in the field utilizing the plotter drum of our new system.

The burner drum 36 may be utilized, if desired, to take a direct record in the field. Fig. 13 shows in block diagram a system which might be utilized to take a direct record in the field. As shown in Fig. 13, a source of seismic energy 150 is expoded to set up waves 151 which are reflected from subsurface 152 and detected by geophone 153. Though only one geophone 153 is shown, it is to be understood that actually a plurality of geophones is utilized. The electric signals generated by geophone 153 are amplified by an amplifier 154 and power amplifier 155. The amplified signals are then recorded by the styli onto the electrosensitive paper located on recording drum 156. Microswitches (not shown) are located on the drum to co-ordinate the firing of the explosive charge 150 through leads 157 with the initiation of the recording operation.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim:
1. Geophysical apparatus for recording a plurality of seismograms to obtain a subsurface cross-section comprising a support, a rotatable shaft mounted on said support, first and second rotatable drums mounted on said shaft, electrosensitive record means arranged on said first drum, a carrier member movable longitudinally relative to said first drum mounted on said support adjacent said first drum, a plurality of electrically conductive styli carried by said carrier member, said styli contacting said electrosensitive record means along only a portion of the length of said first drum, adjustment means connected to said carrier member adapted to move said carrier member longitudinally along the length of said drum, means connected to said adjustment means adapted to permit circumferential movement of said carrier member and said first drum relative to each other, said second drum being provided with a magnetic medium having recorded thereon a plurality of signals resulting from elastic waves reflected from reflecting subsurfaces, a plurality of magnetic heads mounted on said support adjacent said second drum for converting said magnetically recorded signals into electrical signals, means for conducting said electrical signals to said styli and switch means operatively connected to at least one of said drums adapted to control transmission of said electrical signals to said styli upon rotation of said one drum.

2. Geophysical apparatus for recording a plurality of seismograms to obtain a subsurface cross-section comprising a support, a rotatable shaft mounted on said support, first and second rotatable drums mounted on said shaft, electrosensitive record means arranged on said first drum, a carrier member movable longitudinally relative to said first drum mounted on said support adjacent said first drum, a plurality of electrically conductive styli carried by said carrier member, said styli contacting said electrosensitive record means along only a portion of the length of said drum, adjustment means connected to said carrier member adapted to move said carrier member longitudinally along the length of said drum, said second drum being provided with a magnetic medium having recorded thereon a plurality of signals resulting from elastic waves reflected from reflecting subsurfaces, a plurality of magnetic heads mounted on said support adjacent said second drum for converting said magnetically recorded signals into electrical signals, two movable bars pivotally mounted on said support, a rotatable cam mounted on said support operatively connected to said shaft adapted to rotate upon rotation of said shaft, bar actuating means connected to said bars adapted to pivot said bars upon movement of said bar actuating means, a cam rider arm interconnecting said cam and said bar actuating means whereby rotation of said cam causes said actuating means to move said bars to apply a step-out correction on each revolution of said second drum and means mounted on said bars and connected to said magnetic heads whereby individual relative movement of each of said heads is obtained.

References Cited in the file of this patent
UNITED STATES PATENTS

| | | |
|---|---|---|
| 2,243,730 | Ellis | May 27, 1941 |
| 2,416,445 | Jensen | Feb. 25, 1947 |
| 2,427,421 | Rieber | Sept. 16, 1947 |
| 2,440,971 | Palmer | May 4, 1948 |
| 2,447,018 | Keinath | Aug. 17, 1948 |
| 2,501,791 | Silverman | Mar. 28, 1950 |
| 2,615,777 | Deuth | Oct. 28, 1952 |
| 2,620,890 | Lee et al. | Dec. 9, 1952 |
| 2,671,375 | Boucher | Mar. 9, 1954 |
| 2,686,633 | Hale | Aug. 17, 1954 |
| 2,765,455 | Meiners | Oct. 2, 1956 |
| 2,802,201 | Casagrande | Aug. 6, 1957 |
| 2,803,515 | Begun | Aug. 20, 1957 |
| 2,806,757 | Cunningham | Sept. 17, 1957 |
| 2,810,898 | Meiners | Oct. 22, 1957 |
| 2,821,892 | Merten | Feb. 4, 1958 |
| 2,852,762 | MacDonald | Sept. 16, 1958 |

OTHER REFERENCES

Jakosky: "Frequency Analysis of Seismic Waves," Geophysics Magazine, vol. 17, No. 4, October 1952, pp. 721–738.